US005747560A

United States Patent [19]
Christiani et al.

[11] Patent Number: 5,747,560
[45] Date of Patent: May 5, 1998

[54] MELT PROCESS FORMATION OF POLYMER NANOCOMPOSITE OF EXFOLIATED LAYERED MATERIAL

[75] Inventors: Brian R. Christiani, Maplewood; MacRae Maxfield, Plainfield, both of N.J.

[73] Assignee: AlliedSignal Inc., Morristown, N.J.

[21] Appl. No.: 693,566

[22] Filed: Aug. 7, 1996

Related U.S. Application Data

[63] Continuation of Ser. No. 798,489, Nov. 26, 1991, abandoned, which is a continuation-in-part of Ser. No. 744,035, Aug. 12, 1991, abandoned.

[51] Int. Cl.$^6$ ................................ C08J 3/20; C08K 3/34
[52] U.S. Cl. ..................... 523/209; 523/216; 523/210; 523/521; 524/445; 524/449; 524/606
[58] Field of Search ............................ 523/216, 209, 523/210, 521; 524/445, 449, 606

[56] References Cited

U.S. PATENT DOCUMENTS

| 2,531,396 | 11/1950 | Carter et al. | 528/501 |
|---|---|---|---|
| 2,886,550 | 5/1959 | Goren | 524/445 |
| 4,528,235 | 7/1985 | Sacks et al. | 428/220 |
| 4,618,528 | 10/1986 | Sacks et al. | 428/216 |
| 4,739,007 | 4/1988 | Okada et al. | 524/789 |
| 4,810,734 | 3/1989 | Kawasumi et al. | 523/216 |
| 4,874,728 | 10/1989 | Eilliott et al. | 501/148 |
| 4,889,885 | 12/1989 | Usuki et al. | 524/445 |
| 5,091,462 | 2/1992 | Fukui et al. | 524/445 |
| 5,102,948 | 4/1992 | Deguchi et al. | 524/445 |

FOREIGN PATENT DOCUMENTS

| 0813395 | 5/1969 | Canada | 523/209 |
|---|---|---|---|
| 0 352 042 | 1/1990 | European Pat. Off. . | |
| 0 358 415 | 3/1990 | European Pat. Off. . | |
| 0387903 | 9/1990 | European Pat. Off. | 524/445 |
| 0 398 551 | 11/1990 | European Pat. Off. . | |
| 0 459 472 A1 | 12/1991 | European Pat. Off. . | |
| 0 351 337 A1 | 1/1990 | France . | |
| 0038865 | 3/1980 | Japan | 523/210 |

OTHER PUBLICATIONS

S. Fujiwara, *Polyamide Organoclay Composites*, Plastics Manuf., vol. 86, pp. 141006, 1977.

Yano, K. et al., "Polymer Preprints", *Division of Polymer Chemistry, Inc.American Chemistry Society*, vol. 32, No. 1 pp. 65–66 (1991).

T.R. Jones, *The Properties and Uses of Clays Which Swell in Organic Solvents*, English China Clays PLC. St. Austeli, Clay Minerals, vol. 18, pp. 399–440, (1983).

G. Lagaly, *Interaction of Alkylamines with Different Types of Layered Compounds*, Solid State Ionics, pp. 43–51, (1986).

K. Yano, *Synthesis and Properties of Polymide–clay Hybrid*, Polymer Preprings, vol. 32, pp. 65–66 (1991).

A. Okada, *Synthesis and Characterization of a Nylon 6–Clay Hybrid*, Polymer Preprints, Am. Chem. Soz., vol. 28, pp. 447–448, (1987).

Y. Fukushima, *Swelling Behavior of Montmorillonite by Polyamide*, Clay Miner, 23(1), 27–34, (1988).

Y. Fukushima, *Synthesis of an Intercalated Compound of Montmorillonite and 6–Polyaminde*, J. Inclusion Phenom., 5(4), 473–82, (1987).

Toyota Jidoshakk, *Polyamide Resin Compsn. with High Rigidity and Heat Resistance Contains Lamellar Silicate and Heat Resistance Modifier*, (1989).

*Primary Examiner*—Andrew E. C. Merriam
*Attorney, Agent, or Firm*—Roger H. Criss; Colleen Szuch

[57] ABSTRACT

This invention relates to a process of forming a polymeric nanocomposite comprising a continuous polymeric phase formed from a melt processible polymer having amelt processing temperature equal to or greater than about 220° C. and platelet particles having an average thickness equal to or less than about 50 Å and a maximum thickness of about 100 Å having a secondary or primary ammonium cationic complex, a quaternary phosphonium cationic complex bonded to surface of said particles, the composite material formed by said process and an article formed from the composite material.

26 Claims, No Drawings

5,747,560

MELT PROCESS FORMATION OF POLYMER NANOCOMPOSITE OF EXFOLIATED LAYERED MATERIAL

This application is a continuation of application Ser. No. 07/798,489 filed Nov. 26, 1991, now abandoned, which is a continuation-in-part of application Ser. No. 07/744,035 filed on Aug. 12, 1991 (abandoned).

BACKGROUND OF INVENTION

1. Field of the Invention

This invention relates to a process for forming a composite material comprising a polymer matrix having dispersed therein platelet particles, derived from swellable intercalated layered materials, and to composite material formed by the process of this invention. More particularly, this invention relates to such a process where the intercalated layered material has layers which are compatible with the polymer of the matrix, such that during the process the polymer-compatible layers of the intercalated material dissociate one from the other to form platelet fillers.

2. Prior Art

A specific category of polymer nanocomposites has been described as a composite material comprising a polymer matrix containing a polyamide having uniformly dispersed therein layers of silicate. Such nanocomposites are described in U.S. Pat. Nos. 4,739,007 and No. 4,810,734, Deutsches Pat. 3808623 A1, Japanese Patent J 02 208358 A, and technical publications by the patentees (*J. Inclusion Phenomena* 5, (1987), 473–483; *Clay Minerals*, 23, (1988),27; *Polym. Preprints*, 32, (April 1991), 65–66; and *Polym. Prints*, 28, (August 1987), 447–448. This polyamide composite was reported to exhibit enhanced stiffness, strength, and heat resistance. The process for manufacturing this polyamide composite material consists of bringing a swelling agent into contact with a clay mineral to form a complex that can be swollen by a polyamide monomer, mixing the complex with the polyamide monomer at a temperature at which the monomer is a liquid, and heating the mixture to effect polymerization. These references disclose that the preferred swelling agents are carboxyl-containing organic cations, such as 12- aminododecanoic acid, although copper ion, hydrogen ion, aluminum ion, and alkylammonium ions are said to also serve. Carboxyl-containing organic cations are said to be preferred because of their catalytic activity for cationic ring-opening polymerization of lactams and participation in other polyamide syntheses.

Japan Kokai 76,109,998 discloses the treatment of montmorillonite with acidic aminocaproic acid and polymerization of caprolactam in the presence of the treated montmorillonite to form a polyamide composite.

U.S. Pat. No. 4,874,728 discloses organophilic clay comprising smectite clay, quaternary ammonium compound having at least one long (12 to 22 carbon) alkyl chain, and organosilane.

U.S. Pat. No. 2,531,396 discloses elastomer base and a clay modified with an organic onium base and (2) a compounding process consisting of mixing a suspension of modified clay with a rubber latex in the presence of a precipitating agent, and collecting the precipitated coagulum.

Mixing is a well known process for dispersing mineral particles in a polymer melt down to the micron scale. An example of such a process is that described in U.S. Pat. Nos. 4,618,528 and 4,528,235. Such particulate dispersion typically imparts enhanced stiffness and heat resistance over the unfilled polymer. Simply mixing particles of layered minerals does not, however, cause exfoliation of the layers.

Treatment of mineral fillers with molecular agents, which impart favorable interactions with polymers, are known to further improve mechanical properties. See for example E. P. Plueddemann, "Silane Coupling Agents", Plenum, New York, 1982. These molecular agents, or coupling agents, are understood to consist of a portion which bonds to mineral surfaces and another portion which interacts favorably with a selected polymer such that the mineral surface is made compatible with the polymer. The favorable interaction may include reaction to form a covalent bond between coupling agent and polymer, or solubility in the melt phase of the polymer to form an interpenetrating network.

Treatment of swellable layered materials with polar organic molecules and cations have been extensively used to prepare intercalation derivatives of the layered materials. See for example "Intercalation Chemistry" (eds. M. S. Whittingham and A. J. Jacobson, Academic Press, New York, 1982), and G. Lagaly (Solid *State Ionics*, 22,(1986) 43). Swellable layered silicates intercalated with quaternary ammonium cations have been used as rheology control agents in organic systems. See, for example, T. R. Jones (*Clay Minerals*, 18, (1983) 399). Such organic systems include oil-based drilling fluids, oil-based paints, greases, and thermoset resins for fiberglass composites. In these systems, the dispersed silicate acts to modify viscosity under particular shear conditions. In some cases, intercalation compounds have been used as intermediates for subsequent reactions at layer surfaces, such as the grafting of organosilanes to the layer surfaces of a layered mineral. See, for example, Ruiz-Hitzky, Rojo, and Lagaly, *Colloid and Polymer Sci.*, 263 (1985) 1025.

U.S. Pat. No. 4,136,103 discloses layer type clay-like tetraalkyl phosphonium aluminosilicates can be produced by the ion exchange reaction of metal aluminosilicates with phosphonium salts. For example, layered type tetralkyl phosphonium derivatives of clays are prepared by the reaction of sodium clays with tetraalkyl phosphonium chlorides. Substituted tetraalkyl phosphonium clays such as phosphino-, amino-, cyano- and hydroxy-alkyl derivatives are similarly synthesized. The novel compositions have unexpected microstruture, thermal stability, and thioxotropic properties in organic liquids.

Swellable layered minerals, such as montmorillonite and saponite are known to intercalate water to the point that the layers can be exfoliated and dispersed uniformly in water. Dispersion of layers in water is generally aided by mixing with high shear. Such water dispersions are used extensively as rheology modifiers in cosmetics.

SUMMARY OF THE INVENTION

This invention relates to a process for forming a polymeric composite which comprises platelet particles dispersed in a polymeric matrix which comprises the steps of:

(a) forming a "flowable mixture" comprising a melt-processible polymer having a melt processing temperature equal to or greater than about 220° C. and a swellable and polymer-compatible intercalated layered material having layers that are compatible with said polymer which are compatibilized with one or more "effective swelling/compatibilizing agents" selected from the group consisting of cations of the formula:

wherein:

$R_1$ is an organc radical having at least 12 aliphatic carbon atoms;

$R_2$ and $R_3$ are the same or different and are organic radicals having more than about 5 carbon atoms; and $R^4$, $R^4$, $R^4$ and $R^7$ are the same or different and are organic radicals including at least one which has at least about 8 aliphatic carbon atoms; and (b) subjecting said mixture to a shear having a shear rate which is sufficient to dissociate all or a portion of said layers one from the other to form platelet particles having an average thickness equal to or less than about 50 Å, and preferably having a maximum thickness of 100 Å, and to uniformly disperse said platelet particles in said polymer to form said polymer composite.

As used herein, "melt processing temperature" means the polymer has a melt equal to or greater than about melt viscosity of less than about 5000 Pascal.sec at a shear rate of 100 sec$^{-1}$ as measured by capillary rheometry.

Another aspect of this invention relates to a composite material comprising a polymeric matrix which comprises a melt processible polymer having uniformly dispersed therein platelet particles having an average thickness equal to or less than about 50 Å and preferably having a maximum thickness equal to or less than about 100 Å, said platelets having one or more "effective swelling/compatibilizing agents" selected from the group consisting of cations of the formula:

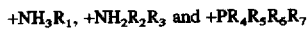

$+NH_3R_1$, $+NH_2R_2R_3$ and $+PR_4R_5R_6R_7$ wherein:

$R_1$ and $R_3$ are the same or different and are organic radicals having more than about 5 carbon atoms; and $R_4$, $R_5$, $R_6$ and $R_7$ are the same or different and re organic radicals having more than about 5 carbon atoms; and $R_4$, $R_5$, $R_6$ and $R_7$ are the same or different and are organic radicals $R_3$ at least about 8 aliphatic carbon atoms. The process is directed toward preparation of polymer composites wherein the dispersed phase comprises platelet particles having two flat opposite faces, the thickness of which particles is the distance between these faces. The thickness is relatively small compared to the size of the flat opposite faces. Dispersing such finely divided platelet particles imparts a very large area of contact between polymer and particles for a given volume of particles in the composite and a high degree of homogeneity of the composite with respect to the particular effect of the dispersed particles. Platelet particles of high strength and modulus, dispersed at submicron size (nanoscale), impart greater mechanical reinforcement to the polymer matrix than do comparable loadings of conventional reinforcing fillers of micron size. Nanoscale barrier layers impart lower permeability to polymers than do comparable loadings of conventional barrier fillers.

The process of this invention exhibits several advantages over monomer blending and polymerizing processes of the type described in U.S. Pat. Nos. 4,810,734 and 4,739,007, also referred to herein as in-reactor processes. These advantages include utility for a broader range of matrix polymers; utility for a wider range of composites having the same matrix polymer due to a larger selection of swelling/compatibilizing agents, each having a distinct bonding interaction with both the polymer and the platelet particle; and greater control over the molecular weight distribution of the matrix polymer. For example, virtually any polymer material that can be made to flow can be compounded with nanoscale particles derived from intercalated layered materials which exfoliate during mixing in accordance with the process of this invention. In contrast, the monomer blending and polymerizing processes of the prior art are restricted to polymers whose monomers are compatible with layered materials and can be polymerized effectively in the presence of the layered material. In the process of the present invention, the compounding entails no special conditions specific to selected polymer molecular weight distributions. On the other hand, in-reactor processes of the prior art require special polymerization conditions for each selected molecular weight distribution due to the effect of a dispersed phase on reaction mixture viscosity and polymerization kinetics. Virtually any loading of intercalated layered material is possible in the process of this invention, whereas in-reactor compounding of the prior art processes may be practically limited to loadings that permit polymerization to proceed to a selected molecular weight.

Another advantage is that compatibilizing agents are secondary and primary ammonium and quaternary phosphonium cation complexes containing specific number of aliphatic carbon atoms. Use of these swelling/compatibilizing agents provide for several advantages over other swelling/compatibilizing agents as for example tertiary and quaternary ammonium cation complexes, and secondary and primary ammonium and quaternary phosphonium cation complexes containing less than specific number of aliphatic carbon atoms. For example, the specific swelling/compatibilizing agents of this invention cover the layers of the layered materials to render their surfaces more organophilic than those compatibilized by tertiary and quaternary ammonium cation complexes and those compatibilized with secondary and primary ammonium cation complexes and quaternary phosphonium cation complexes having less than the specific number of aliphatic carbon atoms. The specific swelling/compatibilizing agents of this invention facilitate exfoliation of the layered material into platelet particles in the polymer melt employing reduced shear mixing resulting in less decomposition of the polymer and reduction in molecular weight. The specific swelling/compatibilizing agents of this invention are more heat stable than other cationic swelling/compatibilizing agents such as tertiary and quaternary ammonium cation complexes and secondary and primary ammonium and quaternary phosphonium cationic complexes having less than the specified number of aliphatic carbon atoms such that the swelling/compatibilizing agents of this do not substantially decompose at melt processing temperatures equal to or greater than about 220° C. into lower molecular weight materials which degrade polymers in the matrix or which are hazardous, either as vapors evolvated during melt processing, or in articles such as films in food and drug packing.

As a further advantage of the present process, unreacted monomer can be removed prior to forming the nanocomposite. This facilitates monomer removal, for example by solvent extraction, since dispersed particles can interfere with this process.

Another aspect of this invention relates to a composite material comprising a polymeric matrix which comprises a melt processible polymer having uniformly dispersed therein platelet particles having an average thickness equal to or less than about 50 Å and preferably having a maximum thickness equal to or less than about 100 Å, said platelets having a chemical species bonded to the surface thereof which are compatibilized with one or more "effective swelling/compatibilizing agents" selected from the group consisting of cations of the formula:

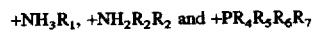

$+NH_3R_1$, $+NH_2R_2R_2$ and $+PR_4R_5R_6R_7$ wherein:

$R_1$ is an organic radical having at least 12 aliphatic carbon atoms;

$R_2$ and $R_3$ are the same or different and are organic radicals having more than about 5 carbon atoms; and $R_4$, $R_5$, $R_6$ and $R_7$ are the same or different and are organic radicals having at least about 8 aliphatic carbon atoms.

The polymeric compositions of this invention exhibit one or more advantages over prior art composites as for example those described in U.S. Pat. Nos. 4,739,007; 2,531,396 and 4,410,734; Deutsches Pat. 3,808,623 A1; Japanese Patent No. 02208358A and EPA 0,398,551; 0,358,415; 0,352,042 and 0,,398,551. For example, the composite of this invention exhibits improved properties such as improved tensile yield strength tensile modulus and/or ultimate elongation. In addition, they exhibit superior ability to fix acidic dyes.

DESCRIPTION OF THE PREFERRED EMBODIMENTS OF THE INVENTION

The first step of this invention comprises forming a "flowable mixture" comprising one or more polymers in a "polymer melt" and at least one "swellable and polymer-compatible intercalated layered material" which comprises polymer-compatible layers that are compatible with said polymers. As used herein, a "flowable mixture" is a mixture which is capable of flowing at the submicron scale so that the layered materials may exfoliate into platelet particles comprising individual or a small multiple of layers, which may in turn disperse within the polymer mixture. As used herein, a "polymer melt" is a melt processible polymer or mixture of polymers which has been heated to a temperature sufficiently high to produce a viscosity low enough for submicron scale mixing to occur. Temperatures used in the first step are not critical and can be varied widely as desired provided that the polymer employed is in the state of a polymer melt. In the preferred embodiments of the invention, process temperature should be at least as high as the melting point of the particular polymer employed, and below the degradation temperature of the polymer. In the more preferred embodiments of this invention, where the polymer is a thermoplastic polymer, the process temperature is such that the polymer will remain in the polymer melt during the conduct of the process. In the case of a crystalline thermoplastic polymers, the temperature is above the polymer's melting temperature. For example, a typical nylon 6 having a melting point of about 225° C. can be melted in an extruder at any temperature equal to or greater than about 225° C., as for example between about 225° C. and about 325° C. For nylon 6, a temperature of preferably from about 250° C. to about 260° C. is normally employed. In the cases of amorphous thermoplastics and vulcanizable rubbers, it is a temperature at which the viscosity is sufficiently low that processing of the polymer can be performed by conventional means.

The manner in which the flowable mixture is formed is not critical and conventional methods can be employed. For example, the flowable mixture can be prepared through use of conventional polymer and additive blending means, in which the polymer is heated to a temperature sufficient to form a polymer melt and combined with the desired amount of the intercalated layered material in a granulated or powdered form in a suitable mixer, as for example an extruder, a Banbury Mixer, a Brabender mixer, a continuous mixer and the like. The polymer melt containing nano-dispersed delaminated layered material may also be formed by reactive extrusion in which the layered material is initially dispersed as aggregates or at the nanoscale in a liquid or solid monomer and this monomer is subsequently polymerized in an extruder or the like. Such monomer or other reactive solid or liquid dispersion can be injected into a polymer melt containing one or more polymers in an extruder or other mixing device. The injected liquid may result in new polymer or in chain extension or grafting to the polymer initially in the melt. Alternatively, the polymer may be granulated and dry mixed with the intercalated layered material, and thereafter, the composition may be heated in a mixer until the polymer is melted forming the flowable mixture. As described above, the flowable mixture is, in the second step, subjected to a shear in a mixer sufficient to form the dispersed nanocomposite structure of platelet particles in the polymer melt, and it is thereafter cooled.

Best results are generally obtained when the flowable mixture includes as little water as possible in order to avoid hydrolytic cleavage of the polymer and/or generation of void defects. Some polymers such as polyolefins can tolerate more than about 0.25% water by weight during melt processing, while others (such as condensation polymers as for example polyamides and polyesters) may be degraded if processed with water content greater than about 0.1% by weight. Consequently, in the most preferred embodiments, both the polymer and the intercalated layered material are rigorously dried and contain substantially no water. Ideally, the intercalated layered material is free of water that can be desorbed at temperatures up to the processing temperature. However, good results can be obtained when the intercalated layered material contains as much as about 2% by weight water and comprises less than about 5% by weight of the flowable mixture. For compounding with condensation polymers, the intercalated layered material preferably contains less than about 1% by weight , more preferably less than about 0.5% by weight water and most preferably less than about 0.25% by weight water.

As a first essential ingredient, the flowable mixture includes a "swellable and polymer-compatible intercalated material". As used herein, a "swellable and polymer-compatible intercalated layered material" is a swellable layered material intercalated by a neutral or ionic intercalant or intercalants comprising one or more effective swelling/compatibilizing agents which act to weaken the interlayer cohesive energy by swelling the interlayer distances and which function to increase the compatibility and bonding of the layers with the polymer melt by having attractive interactions with both the layers and the polymer.

Swellable layered materials are materials comprising planar layers arrayed in a coherent, coplanar structure, where the bonding within the layers, is stronger than the bonding between the layers such that the materials exhibit increased interlayer spacing in their intercalation compounds. The effective swelling/compatibilizing agents may be introduced into the interlayer spaces by either insertion, in the case of neutral molecules, or ion exchange, in the case of ions. The effective swelling/compatibilizing agents may be introduced in the form of a solid, liquid, gas, or solute. The effective swelling/compatibilizing agents may be introduced into the spaces between every layer, nearly every layer, or a large fraction of the layers of the layered material such that the resulting platelet particles comprise less than about 10 layers in thickness. The platelet particles are preferably less than about 8 layers in thickness, more preferably less than about 5 layers in thickness, and most preferably, about 1 or 2 layers in thickness.

Any swellable layered material having the above referenced characteristics may be used in the practice of this invention. Useful swellable layered materials include phyllosilicates. Illustrative of such materials are smectite clay minerals such as montmorillonite, nontronite, beidellite, volkonskoite, hectorite, saponite, sauconite, magadiite, and kenyaite; vermiculite; and the like. Other useful layered materials include illite minerals such as ledikite and admixtures of illites with the clay minerals named above. Other useful layered materials, particularly useful with anionic polymers, are the layered double hydroxides, such as $Mg_6Al_{3.4}(OH)_{18.8}(CO_3)_{1.7} H_2O$ (see W. T. Reichle, J. Catal., 94 (12985) 547), which have positively charged layers and exchangeable anions in the interlayer spaces. Other layered materials having little or no charge on the layers may be useful in this invention provided they can be intercalated with swelling agents which expand their interlayer spacing. Such materials include chlorides such as $ReCl_3$ and $FeOCl$, chalcogenides such as $TiS_2$, $MoS_2$, and $MoS_3$, cyanides such as $Ni(CN)_2$, and oxides such as $H_2Si_2O_5$, $V_6O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$—$2H_2O$, $CaPO_4CH_3$—$H_2O$, $MnHAsO_4$—$H_2O$, $Ag_6Mo_{10}O_{33}$, and the like.

Preferred swellable layered materials are those having charges on the layers and exchangeable ions such as sodium cations, quaternary ammonium cations, calcium cations and the like between the layers which can be intercalated by useful reactive organosilane compound by an ion exchange mechanism. More preferred layered materials are thos having negative charges or basic sites on the layers, preferably at least about 20 basic sites per 100 g of material, more preferably at least about 50 basic sites per 100 g of material and most preferably from about 50 to about 120 basic sites per 100 g of material. Most preferred swellable layered materials are phyllosilicates having a negative charge on the layers ranging from about 0.2 to about 0.9 charges per formula unit and a commensurate number of exchangeable cations in the interlayer spaces. Particularly preferred layered materials are smectite clay minerals such as montmorillonite, nontronite, beidellite, volkonskoite, hectorite, saponite, sauconite, magadiite, and kenyaite, with hectorite and montmorilonite having from about 20 basic sites to about 150 basic sites per 100 g material being the layered material of choice.

The interlayer spacing of the swellable/compatibilized layered material is critical and exfoliation must be sufficient large to allow for exfoliation of the layers during the process. As used herein, the "inter-layer spacing" refers to the distance between the faces of the layers as they are assembled in the intercalated material before any delamination (or exfoliation) takes place. The preferred clay materials generally include interlayer or exchangeable cations such as $Na^+$, $Ca^{+2}$, $K^+$, $Mg^{+2}$ and the like. In this state, these materials do not delaminate in host polymer melts regardless of mixing, because their interlayer spacings are usually equal to or less than about 4 Å. Consequently, the interlayer cohesive energy is relatively strong. Moreover, the metal cations do not aid compatibility between and are not reactive with the surface of the layers and the polymer melt. On treatment with a suitable onium cation of sufficient size, these layered materials are intercalated by the onium cation to increase interlayer distances to the desired extent. In general, the interlayer distance should be greater than about 4 Å, as determined by x-ray diffraction, in order to facilitate delamination of the layered material at the nanoscale. In the preferred embodiments of the invention, the interlayer distance is at least about 6 Å and more preferred interlayer distances are at least about 10 Å.

In order to further facilitate delamination of layered materials into platelet particles and prevent reaggregation of the particles, these layers are intercalated with swelling/compatibilizing agents comprising the effective swelling/compatibilizing agents of this invention which consist of a portion which bonds to the surface of the layers and another portion which bonds or interacts favorably with the polymer. The effective swelling/compatibilizing agent of this invention remains bonded to the surface of th layers during and after melt processing as a distinct interphase that is different from the bulk of the polymer matrix. Such agents preferably include a moiety or moieties which interact with the surface of the layers displacing, totally or in part, the original metal ions and which bonds to the surface of the layers; and includes a moiety or moieties whose cohesive energies are sufficiently similar to that of the polymer that the surface of the platelets is made more compatible with the polymer, thereby enhancing the homogeneity of the dispersion in the polymeric matrix. As used herein "compatible" refers to the extent to which the polymer matrix and the surface coating on the platelet particles (the compatibilizing agent) have a favorable interaction which promotes the intermingling of the matrix polymer and the surface layer in the interphase region. Compatibility derives from one or more of the following criteria: similar cohesive energy densities for the polymer and the derivatized platelets, similar or complimentary capacities for dispersive, polar, or hydrogen bonding interactions, or other specific interactions, such as acid/base or Lewis-acid/Lewis-base interactions. Compatibilization will lead to an improved dispersion of the platelet particles in the matrix and an improved percentage of delaminated platelets with a thickness of less than 50 Å.

The nature of the swelling/compatibilizing agent will vary widely depending on the particular polymer and the particular layered material. The effective swelling/compatibilizing agent of this invention is selected from the group consisting of cations of the formulas:

wherein:

$R_1$ is an organic radical having at least 12 aliphatic carbon atoms;

$R_2$ and $R_3$ are the same or different and are orgnaic radicals having at least about 5 carbon atoms; and $R_4$ $R_5$, $R_6$ and $R_7$ are the same or different and are orgnaic radicals of which at least one has at least about 8 aliphatic carbon atoms.

Illustrative of such suitable $R_1$, $R_2$, $R_3$, $R_4$, $R_5$, $R_6$ and $R_7$ groups are suitable organic radical as for example substituted or unsubstituted alkyl, cycloalkenyl, alkenyl, alkynyl cycloalkyl, alkoxyaryl, or alkylaryl either unsubstituted or substitiuted with amino, alkylamino, dialkylamino, nitro, azido, alkenyl, alkoxy, cycloalkyl, alkyl, alkoxy, cycloalkenyl, alkanoyl, alkylthio, alkyl, arylalkylamino, alkylamino, arylamino, dialkylamino, diarylamino, aryl, alkylsulfinyl, aryloxy, alkylsulfinyl, alkylsulfonyl, arylthio, arylsulfinyl, alkoxycarbonyl, arylsulfonyl, alkylsilane, and a moiety of the formula:

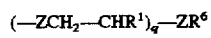

wherein $R^2$ is alkyl, cycloalkyl, or aryl, $R^1$ is hydrogen, alkyl, or aryl, and Z is —O—or —$NR^7$—, where $R^7$ is hydrogen, alkyl, aryl or alkylsilane. Illustrative of useful $R_1$, $R_2$, $R_3$, $R_4$, $R_5$, $R_6$ and $R_7$ groups are alkyl, such as methyl, hexadecyl, octadecyl, octyl, nonyl, tert-butyl, neopentyl, isopropyl, sec-butyl, dodecyl and the like; alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoylalkyl such as butanoyl octadecyl, pentanoyl nonadecyl, octanoyl pentadecyl, ethanoyl undecyl, propanoyl hexadecyl and the like; amino; alkylaminoalkyl, such as methylamino octadecyl, ethylamino pentadecyl, butylamino nonadecyl and the like; dialkylaminoalkyl, such as dimethylamino octadecyl, methylethylamino nonadecyl and the like; arylaminoalkyl such as phenylamino octadecyl, p-methylphenylamino nonadecyl and the like; diarylaminoalkyl, such as diphenylamino pentadecyl, p-nitrophenyl-p'-methylphenylamino octadecyl and the like; alkylarylaminoalkyl, such as 2-phenyl-4-methylamino pentadecyl and the like; alkylsulfinyl, alkylsulfonyl, alkylthio, arylthio, arylsulfinyl, and arylsulfonyl such as butylthio octadecyl, neopentylthio pentadecyl, methylsulfinyl nonadecyl, benzylsulfinyl pentadecyl, phenylsulfinyl octadecyl, propylthiooctadecyl, octylthio pentadecyl, nonylsulfonyl nonadecyl, octylsulfonyl hexadecyl, methylthio nonadecyl, isopropylthio octadecyl, phenylsulfonyl pentadecyl, methylsulfonyl nonadecyl, nonylthio pentadecyl, phenylthio octadecyl, ethylthio nonadecyl, benzylthio undecyl, phenylethylthio pentadecyl, sec-butylthio octadecyl, naphthylthio undecyl and the like; alkoxycarbonylalkyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; aryloryalkyl such as phenoxydecyl, phenoxyoctyl and the like; arylalkyl such as benzyl, phenethyl, 8-phenyloctyl, 10-phenyldecyl and the like; alkylaryl such as 3-decylphenyl, 4-octylphenyl, 4-nonylphenyl and the like; and polypropylene glycol and polyethylene glycol substituents such as ethyl, propyl, butyl, phenyl, benzyl, tolyl, p-styryl, p-phenylmethyl chloride, octyl, dodecyl, octadecyl, methoxy-ethyl, moieties of the formula —$C_3H_6COOH$, —$C_5H_{10}OCOOH$, —$C_7H_{10}COOH$, —$C_7H_{14}COOH$, —$C_9H_{18}COOH$, —$C_{11}H_{22}COOH$, —$C_{13}H_{26}COOH$, —$C_{15}H_{30}COOH$ and —$C_{17}H_{34}COOH$ and $CH=C(CH_3)COOCH_2CH_2$—, and the like. Such ammonium, sulfonium and phosphonium radicals are well known in the art and can be derived from the corresponding amines and phosphines.

Useful swelling/compatibilizing agents may be non-reactive with the polymer matrix but having certain attractive interactions with the polymer matrix such as entanglements, hydrogen bonding, or other specific interactions such as acid/base or Lewis acid/Lewis base interactions and the like. Other useful swelling/compatibilizing agents are reactive with a polymeric component in the polymer to form covalent bonds between matrix the swelling/compatibilizing agent and the polymeric component, or, in the case of secondary ammonium catrons and quaternary phosphonium cations may include both reactive and non-reactive moeities. Useful reactive swelling/compatibilizing agents includes one or more substituents selected from the group consisting of organic radicals which are compatible with the polymer forming the composite and which has substitutents which are reactive with the polymer such as nucleophilic or electrophilic moieties which are capable of electrophilic or nucleophilic displacement reactions coupling and opening reactions and the like as for example amino, carboxy, acylhalide, acyloxy, hydroxy, isocyanato, ureido, halo, epoxy, epichlorohydrin. Illustrative of such reactive moieties are aromatic or aliphatic radical of the formula:

—$R^3$—Z3 wherein:

—$R^3$ is a divalent aromatic chain or aromatic chain which optionally includes one or more divalent heteroatoms or carbonyl groups in the chain; and $Z^3$ is a moiety of the formula: —$N(R^4)C(O)N(R^4)_2$, —$C(R^4)_2X$, —$CR_4=C(R_4)_2$, —$NHR^4)_2$ —$S^-M^+$—$O^-M^+$,

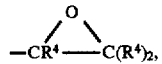

—$C(O)X$, —$SH$, —$S(O)_2X$,

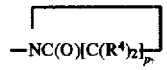

where —$S_4H$, —$S_2H$, —$S(O)X$, —$C(O)NR_4)_2$, —$N=C=O$, —$C(O)OR_4$ —$C(O)$ $OM^+$ and the like;

p is an integer from about 3 to about 20;

X is Cl, Br or I; and

M is a metal cation such as $Li^+$, $Na^+$ and $K^+$;

$R_4$ is the same or different and is the hydrogen or alkyl (preferably having from 1 to about 10 carbon atoms, more preferably having from 1 to about 6 carbon atoms and most preferably having from 1 to about 4 carbon atoms).

Preferred reactive swelling/compatibilizing agents are those having moieties the formula:

—$R^3$—$Z^3$ wherein:

—$R^3$— is divalent substituted or unsubstituted alkylenephenylene, alkylenephenylenealkylene or a divalent moiety selected from the group consisting of:

—$(R^5$—$Z^2)$—$_r$ or —$(R^5$—$Z^2)$—$_rR^5$— wherein:

$R^5$ is the same or different at each substituted or unsubstituted occurrence and are alkylene or phenylene (preferably which include from 1 to about 10 carbon atoms, more preferably from 1 to about 7 carbon atoms and most preferably from 1 to about 4 carbon atoms; and r is an integer equal to or greater than 1 (preferably from 1 to about 15, more preferably from 1 to about 10 and most preferably from 2 to about 6);

wherein permissible substituents are one or more hydroxy, cyano, or alkoxy or alkyl, preferably having from 1 to about 10 carbon atoms, more preferably having from 1 to about 7 carbon atoms and more preferably having from 1 to about 4 carbon atoms;

—$Z^2$—is —$O$—; $NH$—, —$S$—, —$N(H)C(O)$—, —$N(H)C(O)N(H)$—, —$C(O)$—, or —$OC(O)$—;

$Z_3$ is a moiety selected from the group consisting of —$CH_2X$, —$CH=CH_2$, —$NH_2$, —$OH$, —$O^-M^+$,

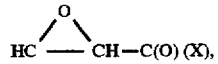

—SH, —S⁻M⁺, —S₂H, —S₄H, —C(O)NH₂,

—N═C—O is an integer from 3 to about 20;

X is Cl, Br or I; and

M is a metal cation such as L⁺, Na⁺ and K⁺.

Swelling/compatibilizing agents containing reactive substituents are well and are selected for particular classes of matrix polymers based on the reactivity and specifically of the reactive moiety. For example polyamides are acid terminated and/or amine terminated and polyesters are acid terminated or hydroxy terminated. Thereof, reactive functional groups which react with acid, amine or hydroxy functions to form covalent bonds can be conveniently used with polyesters and polyamides. Specific reactive functions such as —NH₂, —N═C═O, —CONH₂, —OH, O⁻M⁺ (where M is a metal cation), —C(O)X (where X is Cl, Br, or I) and the like in the reactive silane compound react with reactive functionalities contained in polyesters and polyamide.

Similarly, silanes containing functions such as —NH₂, CH₂—X (where X is Cl, Br or I), —CH₂═CH₂,—SH, S⁻M⁺ (where M⁺ is a metal cation such as Na⁺, Li⁺ and K⁺) and S₄H can be conveniently reacted with polyolefins and halogenated polyolefins such as polyethylene, polypropylene, poly(chlorotrifluoroethylene) or polyolefin elastomers to form covalent bonds between the polyolefins and the reactive silanes. Likewise, polyvinyls such as poly(vinyl chloride), poly(co-ethylene vinyl alcohol) and the like can be reacted with silanes containing —NH₂, —CH₂—S (wherein X is Cl, Br and I) —OH, —O⁻M⁺ (where M is a metal cation such as Li⁺, Na⁺ and K⁺), and the like to form covalent bonds between the polymers and the silane.

Layered material may be derivatized by a single swelling/compatibilizing agent of this invention, or by a mixture of such agents, or by a mixture of one or more thermally stable onium cations with one or more other swelling/compatibilizing agents such as one or more organo silanes or quaternary or tertiary ammonium radicals as for example such swelling/compatibilizing agents which have moieties which are compatible with and which are optionally reactive with the polymer forming the matrix. In the preferred embodiments of the invention the moieties are such that the swelling and compatibilizing agents are lipophilic such that the surface tension, at 20° C., of the derivatized particle is preferably less than or equal to about 55 dyne/cm. More preferably, between about 55 and 15 dyne/cm, and preferably between 45 and 20 dyne/cm, as determined by measuring the contact angles made by sessile drops of liquids on the solid surfaces.

Illustrative of such optional onium compounds are oxonium compounds of the formula:

where X⁺ is a tertiary or quaternary ammonium, radical and R₈ is an organic radical as for example substituted or unsubstituted alkyl, cycloalkenyl, cycloalkyl, aryl, or alkylaryl, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsulfinyl, aryloxy, alkylsulfinyl, alkylsulfonyl, arylthio, arylsulfinyl, alkoxycarbonyl, arylsulfonyl, alkylsilane, and a moiety of the formula:

—(CHR₉Z)_q—R₁₀ wherein R₁₀ is alkyl, cycloalkyl, or aryl, R₉ is hydrogen, alkyl, or aryl, and Z is —O— or —NR₈—, where R₇ is hydrogen, alkyl, aryl or alkylsilane.

Organic radicals, R⁵, which are preferred in primary amines are those having 19 or more alkyl carbons. Layered material derivatized with primary ammonium cations having less than 12 carbons are not sufficiently organophilic to undergo exfoliation in most polymer mets except with exhaustive shear mixing. More preferred are those having 16 or more carbons. Most preferred are those having 18 or more carbons and those having more than one ammonium cation group. Illustrative of primary ammonium cations are protonated primary amines such as octadecylamine, arginine and diamineterminated polyethylene telomer (molecular weight of about 2600, ACX 614 obtained from Allied-Signa).

Organic radicals preferred secondary ammonium cations are those having frou or more carbons. Most preferred are thos having five or mroe carbons and those having more than one ammonium group. Illustrative of these secondary ammonium cations are protonated amines such as dipentyl amine, bis(ethylhexyl)amine, piperidine, piperazine, hexamethyleneimine, and partially protonated polyethyleneimine. Secondary ammonium cations may comprise that one or two polymer-reactive moieties. Illustrative of preferred secondary ammonium cations that are polymer-reactive are protonated 11-(hexylamino)undecanoic acid and bis)8-hexanol)amine.

Organic radicals preferred in phosphonium cations are disclosed in U.S. Pat. No. 4,136,103. They preferably include at least one having 8 or more carbons. More preferably, they include at least 2 groups of 8 or more carbons or at least one group of 16 or more carbons. Most preferably they include at least one group of 18 or more carbons. Illustrative of these phosphonium cations are octyltributylphosphonium, hexadecyltributylphosphonium and vinylbenzyltriethylphosphonium. One or more of the moeities may be polymer-reactive. Illustrative of preferred phosphonium cations having reactive moieties are bis-(dimethylaminopropyl) dodecyl is obutylphosphonium and bis-(hydroxypropyl) octadecylisabutyl phosphonium.

Other useful optional swelling/compatibilizing agents also include neutral compounds. For example useful swelling/compatibilizing agents include neutral amine, phosphine, and sulfide forms of the above-referenced oxonium compounds which hydrogen bond to the layers. In this case, the original metal cations are not replaced.

Another optional class of swelling/compatibilizing agents are polymer reactive and unreactive silane coupling agents of the formula:

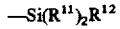

where R¹¹ is the same or different at each occurrence and is alkyl, alkoxy or oxysilane such as trialkoxysilane compounds as for example octadecyltrimethoxysilane, gamma-aminopropyl-triethoxysilane, gamma-aminopropyltrimethoxysilane, gamma-aminopropylphenyldimethoxysilane, gamma-glycidoxypropyl tripropoxysilane, 3,3-epoxycyclohexylethyl trimethoxysilane, gamma-propionamido trithoxysilane, N-trimethoxysilylpropyl-N (beta-aminoethyl) amine, trimethoxysilylundecylamine, trimethoxy silyl-2-chloromethylphenylethane, trimethoxysilyl-ethylphenylsulfonylazide, N-trimethoxysilypropyl-N,N,N-trimethylammonium chloride, N-(trimethoxysilylpropyl)-N-methyl-N,N- diallylammonium chloride, trimethoxysylilpropylcinnamate, 3-mercaptopropyl trimethoxysilane, 3-isocyanatopropyl-triethoxysilane, and the like; and $R^{12}$ is selected from the group consisting of organic radicals which are compatible with the polymer forming the composite.

The preferred intercalated layered materials of the present art enables formation of nanocomposites with high molecular weight polymers. In such preferred cases, the polymer in the nanocomposites has substantially the same molecular weight distribution as obtained for the same polymer similarly processed in the absence of the intercalated material. In contrast, Fukushima et al. show in *Clay Minerals*, 23, (1988), 27 that the number average molecular weight obtained by the in-reactor process substantially decreases with increasing weight percent of the clay in nylon-6. Preferred for the present invention are nanocomposites of nylon 6 in which the number average molecular weight is about 15,000 and the ratio of weight average to number average molecular weight ($M_w/M_n$) is less than 3.0. Especially preferred are those nanocomposites in which the number average molecular weight is above approximately 25,000. In contrast with these preferences, Fukushima et al., (*Clay Minerals*, 23, (1988), 27) teach that the $M_n$ for in-reactor formed nylon nanocomposites decreases from 36,000 at 5.30 wt % $NH_3^+$ $(CH_2)_{10}COOH$— montmorillorite loading ($M_w M_n$=10.5) to 15,000 ($M_w M_n$=11.7) at 18.2 intercalated wt % clay, and to 8,000 ($M_w M_n$=11.7) at 31.4 wt % of intercalated clay. For the purposes of this invention $M_n$ and $M_w$ are measured by gel permeation chromatography in m-cresol at 100° C. and contributions in the distribution from unreacted caprolactam are excluded from Mn and Mw evaluations.

We surprisingly found that omega-aminoacids, the preferred swelling/compatibilizing agents of U.S. Pat. Nos. 4,739,007 and 4,810,734, are not preferred as swelling/compatibilizing agents for swellable clay minerals compounded into molten polymers. Omega-aminoacids do not separate the swellable clay mineral layers by more than 4 Å, once the removable water has been eliminated from the intercalated layered material. Nor are omega-aminoacids lipophilic and they do not make the mineral layers hydrophobic, and cannot be easily dried prior to compounding. Thus, such aminoacid intercalated materials and other such intercalated materials which are intercalated by molecules which tend to lie flat against the layers of the silicate do not readily delaminate in the polymer melt. The resulting large particles and gels which are present in the final polymer composite lead to a reduction of mechanical strength, impact resistance and optical clarity. In contrast, swellable mineral layers swollen and compatibilized with lipophilic swelling/compatibilizing agents of this invention such as the onium salts of secondary and primary hydrocarbon amines, and phosphines (such as octadecylamine), possess no hydrophilic group such as a carboxylate group which can also bond ionically or through hydrogen bonds to the silicate layers. As a result, the lipophilic agents provide interlayer spacings of more than about 4 Å, preferably more than about 8 Å, more preferably equal to or greater than about 10 Å and most preferably equal to or greater than about 15 Å. These intercalants containing lipophilic moieties such as nonreactive polymer hydrocarbon moieties additionally make the layer surfaces hydrophobic so intercalated layered materials are readily dried. Consequently, layers intercalated by such lipophilic materials such as hydrocarbon onium salts less high shear mixing to exfoliate in a polymer melt, to form the desired dispersion and, during melt processing, desorb less water which can cause void defects and react to break polymer chains of condensation polymers such as polyamides, polyesters, polycarbonates, and the like by hydrolysis. Such preferred intercalants produce a polymer composite which contains a high percentage (>95%) of silicate sheets which are dispersed on a nanoscale. These composites in general display superior strength, toughness, and optical clarity.

The amount of swelling agent/compatibilizing agent and swelling/compatibilizing agents intercalated into swellable layered materials useful in this invention may vary substantially provided that the amount is effective to swell and, preferably to compatibilize the layers of the intercalated layered material to the extent required to provide the desired substantially uniform dispersion. In the preferred embodiments of the invention where swelling/compatibilizing agents are employed, amounts of agents employed will preferably range from about 10 mmole/100 g of layered material to about 1000 mmole/100 g of layered material. More preferred amounts are from about 20 mmole/100 g to about 200 mmole/100 g. In the case of the preferred smectite clay minerals, the more preferred amounts are from about 80 mmole/100 g to about 120 mmole/100 g of layered material.

Swellable and polymer-compatible intercalated layered material can be formed by any method. Preferably such materials are formed by intercalation of suitable agent or agents in the interlayer spaces of the swellable layered material by any suitable method. The swelling/compatibilizing agents are introduced into the interlayer spaces of the swellable layered material by any suitable method as, for example, by either insertion of neutral molecules or by ion exchange with ionic molecules, using conventional procedures. Insertion of neutral molecules may be performed by exposing finely divided layered material to intercalants in the form of a gas, neat liquid, finely divided solid, or solute in a solvent which, preferably swells the layered material. Insertion is generally aided by exposure of the mixture of intercalant and layered material to heat, ultrasonic cavitation, or microwaves. Ion exchange by ionic molecules may be performed by suspending the layered material in a relatively volatile liquid which is capable of both exfoliating and dispersing the layers of the intercalated layered material and dissolving a salt of the ionic intercalant as well as the resulting salt of the ion displaced from the layered material (e.g., $Na^+$, $Mg^{+2}$, $Ca^{+2}$), adding the salt of the ionic intercalant, and removing the layered material (now complexed with the new intercalant) from the liquid (now containing the dissolved salt of the displaced ion). For example, swellable layered minerals such as montmorillonite and hectorite (having primarily $Na^+$ cations in the interlayer spaces) intercalate water to the point that the layers are exfoliated and dispersed uniformly in water. Dispersion in water is generally aided by mixing with relatively high shear. A suitable swelling/compatibilization agent such as the hydrochloride salt of dipentylamine is then added in the desired amount after which the layers complexed with the ammonium cation are separated from the dispersion, washed of residual NaCl, and dried. In the preferred embodiments of the invention, the swellable layered material is intercalated by ion exchange. For example, a suspension of a montorillonite or a saponite in water, may be heated to about 80° C. and stirred using a high speed homogenizer mixer, in a concentration low enough to yield a low viscosity dispersion from which non-dispersible particles can be separated by sedimentation (mineral concentration of about 2% by weight, or 5% to 15% with addition of a peptizing agent such as sodium hexametaphosphate).

The dispersion is combined with a solution of a suitable swelling/compatibilizing agent such as an ammonium salt (as, for example the hydrochlorides of octadecylamine, 11-aminoundecanoic acid, dioctylamine, dipentylamine, piperidine, and the like) such that the mole ratio of ammonium salt to exchangeable ions in the mineral is between 0.5 and 5. The amine-complexed layers may be separated from the solution by some suitable method such as filtration or centrifugation, followed by rinsing in fresh water, rough drying, and ball milling to about 100 mesh powder. The powder may be rigorously dried at 100° C. to 140° C. in vacuum for 8 to 24 h in the presence of a drying agent such as phosphorous pentoxide, to provide the desired swellable/polymer compatible intercalated layered material.

Intercalated layered materials intercalated with a mixture of the swelling/compatibilizing agent of this invention and silanes may be formed by treating a swellable and polymer-compatible intercalated layered material already intercalated with a thermally stable swelling/compatibilizing agent of this invention with a silane coupling agent in a swelling liquid, such as dioxane, glyme, diglyme, propanol, toluene, dimethylsulfoxide, methylethylketone, and the like, or by treating an aqueous suspension of a layered material with water-soluble silane coupling agents such as trialkoxysilanes. In the preferred embodiments, silane intercalated swellable/polymer compatible intercalated layered material is formed as follows: Onium-intercalated layered materials, preferably prepared as described above are suspended and swollen in a swelling organic liquid and treated with a trialkoxysilane. For example, montmorillonite intercalated with octadecylammonium cation, at about 80 mmole of ammonium cation/100 g mineral, is combined with dioxane to form a 5% by weight suspension which is heated to 60° C. and combined with a dioxane solution of aminoethylaminopropyl trimethoxysilane, such that the ratio of silane to mineral is about 20 mmole/100 g. The silane displaces the ammonium cation quantitatively to form a mixed intercalated layered material having about 60 mmole of ammonium cation and 20 mmole of silane per 100 g of mineral layers.

In the preferred embodiments of this invention, swellable and polymer-compatible intercalated layered compounds include montmorillonite (Gelwhite HNF, Southern Clay Products) complexed with octdecylammonium cation (100 mmole/100 g mineral), montmorillonite complexed (Volclay, American Colloids Company) complexed with dipentyl ammonium cation (100 mmole/100 g), synthetic hectorite (Laponite S, Laporte Industries) complexed with dioctylammonium cation nature hectorite (Hectorite, Rheox Inc.) complexed with octadecyl triethylphosphonium cation, montmorillonite complexed with octadecylammonium cation (about 80 mmole/g) and derivatized with aminoethylaminopropyltrimethoxysilane (20 mmole/100 g), and the like.

The amount of intercalated layered material included in the mixture may vary widely depending on the intended use of the composite. The amount of intercalated layered material included in the mixture is generally at least about 0.001% by weight of the composite preferably from about 0.001 to about 60% by weight of the composite, more preferably from about 0.01 to about 20% by weight of the composite and most preferably from about 0.1 to about 10% by weight of the composite. The amount of material employed in any particular situation will depend to a significant extent on the intended use. For example, relatively, larger amounts of platelet particles (exclusive of intercalant since the intercalant content in the layered material may vary), i.e. from about 15% to about 30% by wgt. of the mixture, are used in applications where articles are formed by stamping. Substantially enhanced barrier properties and heat resistance (deflection temperature under load, DTUL) are imparted by platelet particle concentrations greater than about 2.5%. Similarly, substantially enhanced strength is imparted by platelet particle concentrations greater than about 1.5%. When it is desired to preserve such properties as toughness (impact resistance) and elongation which are generally adversely affected by high loadings of any filler material including the nano-scale layered materials of this invention, it is preferred that the silicate loading be less than about 0.5%. Particle concentration within the range 0.01 to 0.5% significantly enhance modulus, dimensional stability, and wet strength (the latter in the case of polyamides). Concentrations below 0.5% can be employed to increase melt viscosity (useful in film extrusion and in fiber melt spinning) or they may be employed in selected polymers to stabilize a particular crystalline phase (useful in the case of nylon 6 to stabilize the gamma phase) or limit spherulite size which reduces haze and increases optical clarity. In general, the amount of material employed is less than about 60% by weight of the mixture. The amount of material employed is preferably from about 0.01% to about 20% by weight of the mixture, more preferably from about 0.05% to about 10% by weight of the mixture, and most preferably from about 0.05% to about 8% by weight.

For preferred use in forming nanocomposites, the swelling/compatibilizing agent is selected so that when subjected to the processing temperature of the matrix polymer(s), it does not evolve decomposition products which can cause chain scission or other degradation of the matrix polymers or which can be released as a harmful substance, as for example, an irritating vapor during melt processing and a non-FDA approvable extract. Special care must be taken when polymers which require high processing temperatures are used. For example, quaternary ammonium cations which start to thermally decompose, at about 220° C. into alkenes and amines, may be adequate for use with butyl rubber and polyvinyl chloride, but not for polypropylene, polyamides or polycarbonates.

The second essential ingredient of the flowable mixture is a melt processible polymer. Polymers for use in the process of this invention may vary widely, the only requirement is that they are melt processible. As used herein, a "polymer" in a substance composed of ten or more recurring monomeric units which may be the same or different which is melt processible usefully extruded or injection molded at a temperature equal to or greater than about 220° C., preferably equal to or greater than about 230° C., more preferably from about 230° C. to about 320° C., and most preferably from about 240° C. to about 290° C. In the preferred embodiments of the invention, the polymer includes at least 20 recurring monomeric units. The upper limit to the number of recurring monomeric units is not critical, provided that the melt index of the polymer under use conditions is such that the polymer forms a flowable mixture. More preferably, the polymer includes at least from about 30 to about 100 recurring monomeric units. In the most preferred embodiments of this invention the number of recurring units is such that the polymer has a melt index of from about 0.01 to about 12 grams per 10 minutes at the processing temperature.

Useful polymers are thermoplastic polymers or mixtures thereof, and vulcanizable and thermoplastic rubbers. Thermoplastic resins for use in the practice of this invention may vary widely. Illustrative of useful thermoplastic resins are polylactones such as poly(pivalolactone), poly(caprolactone) and the like; polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenylmethane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly(methane bis(4-phenyl) carbonate), poly(1,1-ether bis(4-phenyl) carbonate), poly(diphenylmethane bis(4-phenyl) carbonate), poly(1,1-cyclohexane bis(4-phenyl)carbonate) and the like; polysulfones; polyether ether ketones; polyamides such as poly (4-amino butyric acid), poly (hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomex), poly(p-phenylene terephthalamide) (Kevlar), and the like; polyesters such as poly(ethylene azelate), poly(ethylene-1,5-naphthalate, poly(1,4-cyclohexane dimethylene terephthalate), poly(ethylene oxybenzoate) (A-Tell), poly(para-hydroxy benzoate) (Ekonol), poly(1,4-cyclohexylidene dimethylene terephthalate) (Kodel) (as), poly(1,4-cyclohexylidene dimethylene terephthalate) (Kodel) (trans), polyethylene terephthlate, polyburylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyesocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane), poly(dimethyl siloxane co-phenylmethyl siloxane), and the like; protein plastics; and blends of two or more of the foregoing.

Vulcanizable and thermoplastic rubbers useful in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton®.

Most preferred thermoplastic polymers are thermoplastic polymers such as polyamides, polyesters, and polymers of alpha-beta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

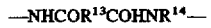

—NHCOR$^{13}$COHNR$^{14}$— in which R$^{13}$ is an alkylene group of at least 2 carbon atoms, preferably from about 2 to about 11 or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6),poly(hexamethylene sebacamide) (nylon 6, 10), poly(hexamethylene isophthalamide), poly(hexamethylene terephthalamide), poly(heptamethylene pimelamide) (nylon 7,7), poly(octamethylene suberamide) (nylon 8,8), poly (nonamethylene azelamide) (nylon 9,9) poly (decamethylene azelamide) (nylon 10,9), poly (decamethylene sebacamide) (nylon 10,10), poly(bis(4-amino cyclohexyl)methane-1,10-decane-carboxamide)), poly(m-xylene adipamide), poly(p-xylene sebacamide), poly(2,2,2-trimethyl hexamethylene terephthalamide), poly (piperazine sebacamide), poly(p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly(11-aminoundecanoic acid) (nylon 11), poly(12-aminododecanoic acid) (nylon 12) and the like.

Preferred polyamides for use in the practice of this invention are poly(caprolactam), poly(12-aminododecanoic acid) and poly(hexamethylene adipamide).

Other polymers which may be employed in the process of this invention are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in the process of this invention.

The particular polyester chosen for use can be a homopolyester or a co-polyester, or mixtures thereof as desired. Polyesters are normally prepared by the condensation of an organic dicarboxylic acid and an organic diols, and, therefore, illustrative examples of useful polyesters will be described hereinbelow in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized in the practice of their invention are poly(ethylene terephthalate), poly(cyclohexlenedimethylene), terephthalate) poly(ethylene dodecate), poly(butylene terephthalate), poly[ethylene(2,7-napthalate)], poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (Kodel) (cis), and poly(1,4-cyclohexylidene dimethylene terephthalate (Kodel) (trans).

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-napthalenedicarboxylic acid, 1,4-napthalenedicarboxylic acid, 2,6-napthalenedicarboxylic acid, 2,7-napthalenedicarboxylic acid, 4,4'-diphenyldicarboxylic acid, 4,4'-diphenysulfphonedicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor.

In the most preferred embodiments of this invention, poly(ethylene terephthalate), poly(butylene terephthalate), and poly(1,4-cyclohexane dimethylene terephthalate) are the polyesters of choice. Among these polyesters of choice, poly(ethylene terephthalate) is most preferred.

Still other useful and preferred thermoplastic homopolymers and copolymers are polymers formed by polymerization of alpha-beta-unsaturated monomers or the formula:

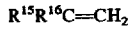

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinylalcohol, acrylonitrile, vinylidene chloride, salts of acrylic acid, salts of methacrylic acid, tetrafluoroethylene, chlorotrifluoroethylene, vinyl chloride and the like. Preferred are poly(propylene), propylene copolymers, poly(ethylene) and ethylene copolymers. More preferred are poly(ethylene) and poly(propylene).

In the preferred embodiments of the invention, the polymers of choice are polymers and copolymers of olefins, polyesters, polyamides and blends thereof containing polyesters. In the particularly preferred embodiments of the invention, polymers and copolymers of ethylene, polyamides (preferably nylon 6 and nylon 66 and more preferably nylon 6), and blends thereof are used.

Some useful polymers may be naturally compatible with the underivatized layers of a layered material, such that the layered material requires only intercalation by a swelling agent to weaken its interlayer cohesive energy. These polymers include polyamides, polyesters, and other polymers having surface energies similar to that of the layers of the swellable layered materials.

The preferred polyamide useful in the preferred invention has a melt index from about 0.01 to about 10 grams/10 minutes, and preferably from 0.5 to 10 grams/10 minutes as measured by ASTM Test No. D-1238 at a load of 1000 grams at 235° C. Amongst these particularly preferred embodiments, most preferred are those embodiments in which the polyamide is nylon 6 or nylon 66, with nylon 6 being the polyamide of choice. The preferred homopolymers or copolymers of ethylene have a melt index of from about 0.01 to about 1.0 grams per 10 minutes, preferably from about 0.05 to about 0.8 grams per 10 minutes as measured according to ASTM Test No. D1238 at a load of 2160 grams at 190° C.

The mixture may include various optional components which are additives commonly employed with polymers. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those of skill in the art, accordingly, only the preferred optional components will be described herein in detail.

In the second step of the process of this invention, the flowable mixture is subjected to a shear having an "effective shear rate". As used herein, an "effective shear rate" is a shear rate [as shear rate is defined in Ferdinand Rodriguez, "Principles of Polymers Systems", McGraw-Hill Book Company, New York (1982)] which is effective to delaminate at least about 90% by weight of the intercalated material to form platelet particles described above, and provide a composition comprising a polymeric matrix having platelet particles substantially homogeneously dispersed therein. In the preferred embodiments of the invention, the shear rate is greater than about 10 $sec^{-1}$. In these preferred embodiments of the invention, the upper limit for the shear rate is not critical provided that the shear rate is not so high as to physically degrade the polymer. In the particularly preferred embodiments of the invention, the shear rate is from greater than about 10 $sec^{-1}$ to abot 20,000 $sec^{-1}$, and in the most preferred embodiments of the invention the shear rate is from about 100 $sec^{-1}$ to about 10,000 $sec^{-1}$.

Any method which can be used to apply a shear to a flowable mixture or any polymer melt can be used. The shearing action can be provided by any appropriate method, as for example by mechanical means, by thermal shock, by pressure alteration, or by ultrasonics. Methods useful in shearing melts are known in the art, and will not be described in great detail. In particularly useful procedures, the flowable polymer mixture is sheared by mechanical methods in which portions of the melt are caused to flow past other portions of the mixture by use of mechanical means such as stirrers, Banbury® type mixers, Brabender® type mixers, long continuous mixers, and extrudes. Another procedure employs thermal shock in which shearing is achieved by alternatively raising or lowering the temperature of the mixture causing thermal expansions and resulting in internal stresses which cause the shear. In still other procedures, shear is achieved by sudden pressure changes in pressure alteration methods; by ultrasonic techniques in which cavitation or resonant vibrations which cause portions of the mixture to vibrate or to be excited at different phases and thus subjected to shear. These methods of shearing flowable polymer mixtures and polymer melts are merely representative of useful methods, and any method known in the art for shearing flowable polymer mixtures and polymer melts may be used.

In the preferred embodiments of the invention, mechanical shearing methods are employed such as by extrusion, injection molding machines, Banbury® type mixers, Brabender® type mixers and the like. In the more preferred embodiments of the invention, shearing is achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone etc.) are several variables which control the amount of shear to be applied.

Upon subjecting a flowable mixture of said swellable intercalated layered material and said polymer melt to shear mixing, at least about 80% by weight, preferably at least about 85% by weight, more preferably at least about 90% by weight and most preferably at least about 95% by weight of the layers of the material delaminate to form platelet particles substantially homogeneously dispersed in the polymer matrix. As used herein, "platelet particles" are particles having two relatively flat opposite faces wherein the thickness of which is the distance between the faces, which is relatively small compared to the size of the faces. As formed by this process, the platelet particles dispersed in matrix polymers have the thickness of the individual layers, or small multiples less than about 10, preferably less than about 5 and more preferably less than about 3 of the layers, and still more preferably 1 or 2 layers. In the preferred embodiments of this invention, intercalation of every interlayer space is complete so that all or substantially all individual layers delaminate one from the other to form separate platelet particles. In cases where intercalation is incomplete between some layers, those layers will not delaminate in the polymer melt, and will form platelet particles comprising those layers in a coplanar aggregate. These latter platelet particles still constitute nanoscale and nanodispersed fillers and provide enhanced properties over and above those provided by conventional micro-scale fillers, as long as they are less than about 10 layers thick and preferably less than 5 layers thick. The other dimensions of the platelet particles may vary greatly, but in the case of particles derived from clay minerals, the particle faces are roughly round or oblong having average diameters between about 10,000 Å and about 50 Å, such that the aspect ratio length/thickness ranges from about 1000 to about 1. For the purposes of the present invention, the average diameter is defined as the diameter of a circle having an area equal to the surface area of one broad surface face of the platelet shaped particle. The average diameter is determined from particle surface area as measured with a Leitz Texture Analyzer System in a fully computerized and automated mode. In the preferred embodiments of the invention the average thickness of the platelet particles is equal to or less than about 20 Å and the average diameter is between 5,000 Å and 100 Å. Most preferably the average thickness is about 10 Å. The most preferred average diameter depends on both the desired property of the nanocomposite and the ease of complete intercalation and delamination to form the nanocomposite structure. High aspect ratios, and therefore large average diameters, are generally preferred for reinforcement and barrier properties, while layered materials having smaller platelets are preferred for their ease of delamination. Thus, for purposes of the nanocomposite properties, the most preferred average diameter is greater than about 150 Å, and, for purposes of delamination, it is less than about 3000 Å.

The average interparticle spacing between delaminated layers may vary widely after shearings, depending on the concentration of layered material. In general the higher the concentration of layered material in the polymer matrix particle the smaller the interparticle spacing; and conversely, the lower the concentration of layered material, the larger the interparticle spacing. In general, interparticle spacing is equal to or greater than 15 Å. The interparticle spacing is preferably equal to or greater than about 20 Å more preferably equal to or greater than about 30 Å and most preferably equal to or greater than about 50 Å.

As used herein "uniformly dispersed" is defined as a degree of dispersion of the platelet shaped particles having a standard deviation in platelet particle density, down to a sampling volume of $10^{-15}m^3$, which is preferably less than about 50% of the mean, more preferably less than about 30% of the mean, and most preferably less than about 20% of the mean as determined from estimates based on transmission electron microscopy.

The process of this invention is preferably carried out in the absence of air, as for example in the presence of an inert gas, such as, argon, neon, nitrogen or the like. The process can be carried out in a batchwise or discontinuous fashion, as for example, carrying out the process in a sealed container. Alternatively, the process can be carried out in a continuous fashion in a single processing zone, as for example by use of an extruder, from which air is largely excluded, or in a plurality of such reaction zones in series or parallel.

The nanocomposites of this invention exhibit useful properties which are superior to those predicted by U.S. Pat. Nos. 4,739,007 and 5,810,734. Various useful performance indices can be devised in order to jointly assess different performance aspects using a single number. Depending upon the nature of the devised index, comparisons can be made either between samples containing the same loading of layered material or the index can be more broadly applied to polymers having different loadings of clay. For example, the effect of adding nanoscale particulate fillers dispersed platelet particles to a polymer typically increases tensile modulus and ultimate tensile strength while decreasing ultimate elongation. In the case where combinations of high modulus (Y) and high ultimate elongation ($\Delta L/L$) are required, a useful performance index for comparing samples with similar particulate loading is $Y(\Delta L/L)$. Likewise, when tensile strength(S) combined with high ultimate elongation is sought, a useful performance index for comparing samples with similar loading levels is $S(\Delta L/L)$. The preferred embodiments of the present invention provide a $Y(\Delta L/L)$ of above about 660 MPa (preferably equal to or greater than about 800 MPa more preferably equal to or greater than about 1000 MPa and most preferably equal to or greater than about 1200 MPa) for a loading of about 2% of nanodispersed layered material such as montmorillonite in a melt processible polymer such as nylon 6. In contrast, the prior art patents on in-reactor nanocomposite blends (U.S. Pat. No. 4,739,007 and U.S. Pat. No. 4,810,734) provide a maximum $Y(\Delta L/L)$ of about 660 MPa. Also, preferred embodiments of the present invention provide a $S(\Delta L/L)$ of above about 20 MPa (preferably equal to or greater than about 25 MPa and more preferably equal to or greater than about 30 MPa) for a loading of about 2% intercalated layered material such as montmorillonite, while the maximum value for this figure of merit obtained in the above mentioned in-reactor process patents is about 20 MPa at 2% loading. While we do not wish to be bound by any theory, it is believed that the unique properties of the nanocomposites of this invention result from the use of swelling/compatibilizing agents which do not react to become part of the main chain of the matrix polymer (as do the swelling agents preferred in the prior art U.S. Pat. No. 4,739,007 and U.S. Pat. No. 4,810,734) when used in the in-reactor processes. Instead, the preferred swelling/compatibilizing agents of this invention, which remain bonded to the particle surface, interact with the matrix polymer in one or more of the following ways: (1) covalent bond formation to form branches on the main chains of the matrix polymer, (2) hydrogen, ion-dipole, and dipole-dipole bonding with portions of the matrix polymer, and (3) Van der Waals attraction and entanglement with the matrix polymer. Nanocomposites having particularly attractive combinations of modulus, tensile strength and ultimate elongation are formed using swelling/compatibilizing agents, under category (3) above, which are bonded to the particle surface, and whose polymer-interacting moiety projects away from the particle surface and is only weakly bonded to the natrix polymer. This function is best performed by secondary ammonium compoumds of the formula $^+NH_3R_1$ primary ammonium compounds of the formula: $^+NH_2R_2R_3$ and quatermary phosphonium compounds of the formula $^+R_4R_5R_6R_7$ of the type having a lipophilic moiety such that the surface tension, at 20° C., of the derivatized particle is less than about 55 dyne/cm, preferably between about 55 and 15 dyne/cm, and more preferably between 45 and 20 dyne/cm, as determined by measuring the contact angles made by sessile drops of liquids on the solid surfaces. Illustrative of these preferred secondary ammonium compounds, primary ammonium compounds and quatermary phosphonium of the formula:

$^+NH_3R_1$, $NH_2R_2R_3$ or $^+PR_4R_5R_6R_7$ wherein $R_1$, at least one or $R_2$ and $R_3$ or at least one of $R_4$, $R_5$, $R_6$ and $R_7$ is alkyl, alkenyl, cycloalkyl, alkoxyalkyl, alkynyl, phenylalkyl, alkoxyphenyl, alkenylphenyl, phenylalkenyl, phenyalkynyl, alkynylphenyl or the like, preferably alkyl which include sufficient number of aliphatic carbon atoms such that the radical on the particle has a surface tension at 20° C. of less than about 55 dyne/cm. The surface tension of platelet particles derivatized with agents containing octadecane moieties is estimated to be about 31 to about 38 dyne/cm by analogy to poly(ethylene) and poly(propylene). In contrast, the surface tension of 11-aminoundecanoic acid is estimated to be about 59 dyne/cm by analogy to poly(ethylene-co-acrylic acid) (20 mole % acrylic acid) (Polymer Handbook, Third Edition, J. Brandrup and E. H. Immergut, eds. (Wiley, New York, 1989) pp. VI411).

The nanocomposite compositions according to the invention are thermoplastic and, in some cases, vulcanizable materials from which molded articles of manufacture having valuable properties can be produced by conventional shaping processes, such as melt spinning, casting, vacuum molding, sheet molding, injection molding and extruding. Examples of such molded articles are components for technical equipment, apparatus castings, household equipment, sports equipment, bottles, containers, components for the electrical and electronics industries, car components, circuits, fibers, semi-finished products which can be shaped by machining and the like. The use of the materials for coating articles by means of powder coating processes is also possible, as is their use as hot-melt adhesives. The molding compositions according to the invention are outstandingly suitable for specific applications of all types since their spectrum of properties can be modified in the desired direction in manifold ways. Such molded products of this invention will derive one or more advantages over products molded with polymers having no nanodispersed platelet particles including increased modulus, stiffness, wet strength, dimensional stability, and heat deflection temperature, and decreased moisture absorption, flammability, permeability, and molding cycle time.

The molding compositions according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

The compositions of this invention are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness. In the film, the major plane of the platelet fillers is substantially parallel to the major plane of the film. The extent of parallelism of particles and film can be determined by X-ray analysis. X-ray analysis is a useful way to described the crystallinity and orientation of polymer crystals and the orientation of platelet particles. A convenient method of X-ray analysis is that described in Hernans, P. H. and Weidinger A., *Makromol Chemie*, Vol. 44, pp. 24–36 (1961), hereby incorporated by reference.

For the purpose of the present invention Op, the platelet orientation factor, is an indication of the platelet particle orientation in the film. The Op was determined by making azimuthal scans from densitometer tracings of the X-ray photographs which were obtained by exposing the edge of the film to the incident X-rays. The angle is the angle between the reference direction, the normal to the film, and the normal to the plane of interest, the major plane of the platelet. The Op values were calculated as the average cosine square ($<\cos^2>$) for the normal to the flat faces of the platelet particles. An Op of 1.0 indicates that the faces of the platelets are completely parallel to the plane of the film. An Op of 0.0 indicates that the faces of the platelets are perpendicular to the plane of the film. The Op of the platelets in the film of the present invention is preferably from about 0.70 to about 1.0, more preferably from about 0.90 to about 1.0 and most preferably from about 0.95 to about 1.0. Such preferred orientation of platelet particles results in enhanced barrier properties and increased tare strength.

The homogeneously distributed platelet particles and polymer are formed into a film by suitable film-forming methods. Typically, the composition is melted and forced through a film forming die. The die can be a flat die or a circular die. A typical flat die is a hanger shaped die, and a typical circular die is a tubular film die.

The film of the nanocomposite of the present invention may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films of this invention may exhibit one or more of the following benefits: increased modulus, wet strength, and dimensional stability, and decreased moisture adsorption and permeability to gases such as oxygen and liquids such as water, alcohols and other solvents.

The following specific examples are presented to more particularly illustrate the invention and are not to be construed as limitations thereon.

EXAMPLE 1

Nylon 6 nanocomposite of a layered material derivatized with a secondary ammonium cation was prepared by compounding, in a melt extrusion process, nylon 6 with 4% (w/w) of montmorillonite derivatized with dipentyl ammonium cation. The organoclay was prepared by combining an aqueous solution of dipentyl ammonium chloride with a 5% aqueous dispersion of montmorillonite (Gel White HNF, obtained from Southern Clay Products) at about 80° C. with high shear mixing. The stoichiometry of the exchange reaction was 0.125 mole of the dipentyl ammonium chloride per 100 g of clay. The organoclay flocculated immediately and, after standing overnight at room temperature, was collected by filtration. The organoclay was washed 4 times with hot water until free of chloride ions, dried in air at 120° C., ground to pass through a 75 micron sieve, and further dried at 120° C. (full vacuum) for 18 hours just prior to compounding. Samples of the montmorillonite-dipentyl ammonium cation complex powder were evaluated by thermogravimetric analysis at a heating rate of 10 degree C. per minute in inert atmosphere. The apparent decomposition temperature and the extent of decomposition during heating to 3004° C. are set forth in Table 1.

TABLE 1

THERMOGRAVIMETRIC ANALYSIS OF INTERCALATED MONTMORILLONITES*

| Exp. No. | swelling/ compatibilizing cation | decomposition onset temperature (C.) | weight loss between 100 and 300° C. (% of total onium ion content) |
|---|---|---|---|
| 1 | dipentyl ammonium (secondary) | 275 | 5.6 |

*Claytone APA (montmorillonite complex) obtained from Southern Clay Products.

According to the results summarized in Table 1, the montmorillonite complex of the secondary ammonium cation was more thermally stable than either the tertiary or the quaternary ammonium cation complexes.

The montmorillonite-dipentyl ammonium cation complex powder was dry mixed with nylon 6 pellets, and this mixture was extruded using a Leistritz twinscrew extruder equipped with general purpose screws. The extruder was adjusted as follows: heat zones 1–9 at 220°–230 C., die 250° C., RPM 250. The pelletized extrudate was molded into test samples. Dry as molded samples were tested for their tensile properties according to the procedures of ASTM D638, and for their heat deflection temperature under a load of 264 psi (DTUL 264 psi) according to the procedures of ASTM D648. The results are set forth in Table 2.

TABLE 2

NYLON 6-MONTMORILLONITE NANOCOMPOSITES

| Exp. No. | swelling/ compatibilizing agent | weight % montmorillonite* | Tensile Modulus, psi (MPa) | Tensile Strength, psi (MPa) | Ultimate Elongation % | DTUL 264 psi, C. |
|---|---|---|---|---|---|---|
| 1 | dipentyl ammonium | 2.95 | 489,300 (3,370) | 11,600 (80) | 44 | 72 |

*Determined by Loss on Ignition.

According to the results summarized in Table 2, the montmorillonite complex of the secondary ammonium cation imparted superior elongation along with comparable tensile modulus, tensile yield strength, and heat d eflection under load to those exhibited by nylon 6 nanocomposites of montmorillonite complexed with an a cidic omega-aminoacid.

COMPARATIVE EXAMPLE 1

A tertiary alkylammonium cation complex of montmorillonite was prepared according to the procedure of Example 1 except that an aqueous solution of dimethyldodecylamine hydrochloride was added to the montmorillonite dispersion. The dried, powdered complex was tested by thermogravimetric analysis, and the results are ste forth in Table 3. For comparison purposes, a quaternary alkylammonium cation complex obtained from Southern Clay Products Inc. under the Trademark Claytone APA was also subjected to thermogravimetric analysis. The results for these analysis together with the thermogravimetric results from Table 1 of Example 1 are set forth in Table 3.

TABLE 3

THERMOGRAVIMETRIC ANALYSIS OF INTERCALATEDMONTMORILLONITES

| Exp. No. | swelling/ compatibilizing cation | decomposition onset temperature (C.) | weight loss between 100 and 300° C. (% of total onium ion content) |
|---|---|---|---|
| 1 | dipentyl ammonium (secondary) | 275 | 5.6 |
| 2 | dimethyldodecyl ammonium (tertiary) | 190 | 27.8 |
| 3 | quaternary alkylammonium* | 220 | 38.2 |

*Claytone APA (montmorillonite complex) obtained from Southern Clay Products.

COMPARATIVE EXAMPLE 2

A nylon 6 nanocomposite of a layered material derivatized with an acidic omega-aminoacid cation was prepared by compounding, in a melt extrusion process, nylon 6 with about 3% (w/w) of montmorillonite derivatized with protonated 11-aminoundecanoic acid cation. The montmorillonite complex was prepared, compounded, molded and tested according to the procedure of Example 1 except that an aqueous solution of 11-aminoundecanoic acid hydrochloride was used. The results of the tests are set forth in Table 4. For comparison purposes, nylon 6 was subjected to analysis of ultimate elongation, tensile modulus, tensile strength, and heat deflection under load. These results, together with comparable data for nylon 6 having montmorillonite dipentyl ammonium cation complex are set forth in the following Table 4.

ion imparted superior elongation along with comparable tensile modulus, tensile yield strength, and heat deflection under load to those exhibited by nylon 6 nanocomposites of montmorillonite complexed with an acidic omega-aminoacid.

What is claimed is:

1. A composite material comprising:
    a) a polymer matrix which comprises a melt processible polymer having a melt processing temperature equal to or greater than about 220° C., and
    b) dispersed platelet particles having average thickness less than 50 Å and a maximum thickness of about 100 Å, and having an onium chemical species bonded to them, said chemical species selected from the group consisting of onium compounds of the formula +NH$_3$R$_1$ and +NH$_2$R$_2$R$_3$ wherein: R$_1$ has the formula —(CHR$_9$Z)$_q$—R$_8$ and R$_2$ and R$_3$ are the same or different and are organic radicals having at least about 4 carbon atoms; and R$_2$, and R$_3$ are alkyl, alkenyl, alkynyl, aryl, alkoxy, alkoxyalkyl, aryloxyalkyl, aryloxyaryl, cycloalkyl. cycloalkenyl, cycloalkynyl, alkanoylalkyl, alkylaryl, arylalkyl, amino, alkylaminoalkyl, dialkylaminoalkyl, arylaminoalkyl, diarylaminoalkyl, alkylarylaminoalkyl, alkylsulfinyl, alkylsulfonyl, alkylthio, arylsulfinyl, arylsulfonyl, arylthio, alkoxycarbonylalkyl, a moiety of the formula:

—(CHR$_9$Z)$_q$—R$_8$ wherein R$_8$ is alkyl, cycloalkyl, or aryl, R$_9$ is hydrogen, alkyl, or aryl, q is an integer equal to or greater than 1, and Z is —O— or —NR$_{10}$— where R$_{10}$ is hydrogen, alkyl, aryl, or alkylsilane, or a moiety of the formula

—R$_{11}$—Z$_1$—R$_{12}$ or R$_2$ and R$_3$ together form a divalent moiety of the formula:

—R$_{11}$—,—R$_{11}$—Z$_1$—R$_{11}$, or —R$_{11}$Z$_1$ completing an alicyclic ring, wherein —R$_{11}$ is alkylene,, alkenylene, alkynylene, and —Z$_1$— is —O—, —NR$_{13}$—, —+N(R$_{13}$)$_2$—, —S—, —S(O)$_2$—, —OC(O)—, or —N(R$_{13}$)C(O)—; wherein R$_{12}$ is alkyl, alkylaryl, alkoxyalkyl, alkenyl, alkynyl, aryl, cycloalkyl, or cycloalkenyl and R$_{13}$ is hydrogen or alkyl having from 1 to 4 carbon atoms; wherein

TABLE 4

NYLON 6-MONTMORILLONITE NANOCOMPOSITES

| Exp. No. | swelling/ compatibilizing agent | weight % montmorillonite* | Tensile Modulus, psi (MPa) | Tensile Strength, psi (MPa) | Ultimate Elongation % | DTUL 264 psi, C. |
|---|---|---|---|---|---|---|
| 1 | dipentyl ammonium | 2.95 | 489,300 (3,370) | 11,600 (80) | 44 | 72 |
| 2 | acidic 11-amino-undecanoic acid | 2.5 | 498,000 (3,440) | 11,600 (80) | 12 | 75 |
| 3 | Nylon 6 | 0 | 350,000 (2,414) | 9,500 (66) | 26 | 55 |

*Determined by Loss on Ignition.

According to the results summarized in Table 4, the montmorillonite complex of the secondary ammonium catthe onium compounds are either unsubstituted or have as substituents amino, alkenyl, oxide, acyloxy, hydroxy, isocyanato, ureido, halo, epoxy, epichlorohydrin, sulfuryl halide, mercapto, ester, —NH$_2$, CONH$_2$, CH$_2$—X (where X is Cl, Br, or I), —CH=CH$_2$, —SH, S—M+, or O—M+ (where M+ is Na+, Li+, and K+) moieties, said platelet particles being present in an amount of from about 0.001 to about 60% by weight of the composite material.

2. Composite material of claim 1 wherein said platelet particles are derived from phyllosilicates.

3. Composite material of claim 2 wherein said phyllosilicates have from about 0.2 to about 0.9 basic charges per formula unit.

4. Composite material of claim 3 wherein said phyllosilicates are smectites clay minerals.

5. Composite material of claim 4 wherein said smectites are selected from the group consisting of montmorillonite, nontronite, beidellite, volkonskoite, hectorite, saponite, sauconite, magadiite and kenyaite.

6. Composite material of claim 5 wherein said smectites are montmorrillonite or hectorite.

7. Composite material of claim 3 wherein said swelling/ compatibilizing agent is selected from the group consisting of primary ammonium cationic complexes of the formula:

$$^+NH_3R_1 \text{ or } ^+NH_2R_2R_3$$

wherein:

R$^1$ is an aliphatic radical having at least about 15 aliphatic carbon atoms, said radical including one or more heteroatoms, carbonyl functions or a combination thereof; and R$_2$ and R$_3$ are the same or different and are aliphatic radicals having at least about four aliphatic carbon atoms, or R$_2$ and R$_3$ together may form a divalent aliphatic chain having at least about four aliphatic carbon atoms forming an alicyclic structure, said radical or chain optionally including one or more heteroatoms, carbonyl function or a combination thereof.

8. Composite material of claim 7 wherein:

R$_1$ is an aliphatic radical having at least about 18 carbon atoms, said aliphatic radical includes one or heteroatoms, carbonyl functions or a combination thereof; and R$_2$ and R$_3$ are the same or different and are aliphatic radicals having at least about five aliphatic carbon atoms or R$_2$ and R$_3$ together may form a divalent aliphatic chain having at least about five aliphatic carbon atoms, said aliphatic radicals and chain may optional include one or more heteroatoms, carbonyl functions or a combination thereof.

9. Composite material of chain 8 wherein:

R$_2$ and R$_3$ are the same or different and are cycloalkyl, cycloalkenyl, cycloalkynyl, alkyl, alkenyl or alkynyl or a moiety of the formula:

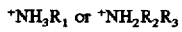

or R$_2$ and R$_3$ together may form a divalent moiety of the formula:

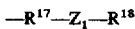

completing an alicyclic ring, wherein:

—R$^{17}$— is the same or different at each occurrence and is divalent, alkylene, cycloalkylene, cycloalkenylene, alkenylene or alkynylene;

—R$^{18}$ is alkyl, alkylaryl, alkoxyaryl, alkenyl, alkynyl, aryl, cycloalkyl, or cycloalkenyl;

—Z$_1$— is —O—, —NR$^{19}$—, —$^+$N(R$^{19}$)$_2$—, —S—, —S(O)$_2$, —OC(O)— or —N(R$^{19}$)C(O)— and R$^{19}$ is hydrogen or alkyl having from 1 to abot 4 carbon atoms.

10. Composite material of claim 9 wherein:

R$_2$ and R$_3$ are the same or different and are alkyl; or R$_2$ and R$_3$ together may form a divalent moiety of the formula:

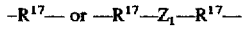

—R$^{17}$— is alkylene;

Z$_1$ is —O—, —NH—or —$^+$N(R$^{19}$)$_2$—;

R$^{19}$ is hydrogen or alkyl of from 1 to about 4 carbon atoms.

11. Composite material of 1 wherein said polymeric matrix comprises a polyamide selected from the group consisting of nylon-6, nylon 6,6 or nylon -12.

12. Composite material of claim 1 wherein said platelet particle is less than about 50 Å thick.

13. Composite material of claim 12 wherein said platelet particle is less than about 20 Å in thickness.

14. Composite material of claim 13 wherein the thickness of said platelet particle is about 5 to about 20 Å thick.

15. Composite material of claim 14 wherein the average interparticle spacing between platelet particles is greater than about 15 Å.

16. Composite material of claim 15 wherein the average interparticle spacing between platelet particles is greater than about 200 Å.

17. Composite material of claim 16 wherein the average interparticle spacing between platelet particles is greater than about 2,000 Å.

18. Composite material of claim 16 wherein the amount of platelet particles in said material is equal to or greater than about 0.01% by weight of the material.

19. Composite material of claim 18 wherein said amount is from 0.01 to about 60% by weight of the material.

20. Composite material of claim 19 wherein said amount is from about 0.01 to about 40 by weight of the material.

21. Composite material of claim 20 wherein said amount is from about 0.1 to about 30 by weight of the material.

22. An article of manufacture comprising a body, said body fabricated, totally or in part, from a composite material comprising a polymer matrix comprising a melt processible polyamide polymer having a melt processing temperature equal to or greater than about 220° C. and dispersed platelet particles having average thickness less than 50 Å, said particles having an onium chemical species bonded to the surface thereof, said onium species of the formula:

$$+NH_3R_1 \text{ and } +NH_2R_2R_3$$

wherein: R$_1$ has the formula —CHR$_9$Z)$_q$—R$_8$ and R$_2$ and R$_3$ are the same or different and are organic radicals having at least about 4 carbon atoms; and R$_2$, and R$_3$ are alkyl, alkenyl, alkynyl, aryl, alkoxy, alkoxyalkyl, aryloxyalkyl, aryloxyaryl, cycloalkyl, cycloalkenyl, cycloalkynyl, alkanoylalkyl, alkylaryl, arylalkyl, amino, alkylaminoalkyl, dialkylaminoalkyl, arylaminoalkyl, diarylaminoalkyl, alkylarylaminoalkyl, alkylsulfinyl, alkylsulfonyl, alkylthio, arylsulfinyl, arylsulfonyl, arylthio, alkoxycarbonylalkyl, a moiety of the formula:

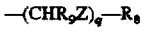

wherein R$_8$ is alkyl, cycloalkyl, or aryl, R$_9$ is hydrogen, alkyl, or aryl, q is an integer equal to or greater than 1, and Z is —O— or —NR$_{10}$— where R$_{10}$ is hydrogen, alkyl, aryl, or alkylsilane, or a moiety of the formula $$-R_{11}-Z_1-R_{12}$$

or R$_2$ and R$_3$ together form a divalent moiety of the formula:

$$-R_{11}-, -R_{11}-Z_1-R_{11} \text{ or } -R_{11}Z_1$$

completing an alicyclic ring, wherein —R$_{11}$— is alkylene, alkenylene, alkynylene, and —Z$_1$— is —O—, —NR$_{13}$—, —+N(R$_{13}$)$_2$—, —S—, —S(O)$_2$—, —OC(O)—, or —N(R$_{13}$)C(O)—; wherein R$_{12}$ is alkyl, alkylaryl, alkoxyalkyl, alkenyl, alkynyl, aryl, cycloalkyl, or cycloalkenyl and R$_{13}$ is hydrogen or alkyl having from 1 to 4 carbon atoms; wherein the onium compounds are either unsubstituted or have as substituents amino, alkenyl, oxide, acyloxy, hydroxy, isocyanato, ureido, halo, epoxy, epichlorohydrin, sulfuryl halide, mercapto, ester, —NH$_2$, CONH$_2$, CH$_2$—X (where X is Cl, Br, or I), —CH=CH$_2$, —SH, S—M+, or O—M+ (where M+ is Na+, Li+, and K+) moieties, said platelet particles being present in an amount of from about 0.001% to about 60% by weight of the composite material.

23. A process for forming a polymeric composite which comprises platelet particles dispersed in a polymeric matrix, said process comprising:

(a) forming a flowable mixture comprising a polyamide polymer melt at a temperature equal to or greater than about 220° C. and a swellable and polymer-compatible intercalated layered material having an onium species is bonded to the surface of the layers of said material, said onium species of the formula:

$$+NH_3R_1 \text{ and } +NH_2R_2R_3$$

wherein: R$_1$ has the formula —(CHR$_9$Z)$_q$—R$_8$ and R$_2$ and R$_3$ are the same or different and are organic radicals having at least about 4 carbon atoms; and R$_2$, and R$_3$ are alkyl, alkenyl, alkynyl, aryl, alkoxy, alkoxyalkyl, aryloxyalkyl, aryloxyaryl, cycloalkyl, cycloalkenyl, cycloalkynyl, alkanoylalkyl, alkylaryl, arylalkyl, amino, alkylaminoalkyl, dialkylaminoalkyl, arylaminoalkyl, diarylaminoalkyl, alkylarylaminoalkyl, alkylsulfinyl, alkylsulfonyl, alkylthio, arylsulfinyl, arylsulfonyl, arylthio, alkoxycarbonylalkyl, a moiety of the formula:

$$-(CHR_9Z)_q-R_8$$

wherein R$_8$ is alkyl, cycloalkyl, or aryl, R$_9$ is hydrogen, alkyl, or aryl, q is an integer equal to or greater than 1, and Z is —O— or —NR$_{10}$ where R$_{10}$ is hydrogen, alkyl, aryl, or alkylsilane, or a moiety of the formula $$-R_{11}-Z_1-R_{12}$$

or R$_2$ and R$_3$ together form a divalent moiety of the formula:

$$-R_{11}-, -R_{11}-Z_1-R_{11}, \text{ or } -R_{11}Z_1$$

completing an alicyclic ring, wherein —R$_{11}$— is alkylene, alkenylene, alkynylene, and —Z$_1$ is —O—, —NR$_{13}$—, —+N(R$_{13}$)$_2$—, —S—, —S(O)$_2$, —OC(O) or —N(R$_{13}$)C(O)—; wherein R$_{12}$ is alkyl, alkylaryl, alkoxyalkyl, alkenyl, alkynyl, aryl, cycloalkyl, or cycloalkenyl and R$_{13}$ is hydrogen or alkyl having from 1 to 4 carbon atoms; wherein the onium compounds are either unsubstituted or have as substituents amino, alkenyl, oxide, acyloxy, hydroxy, isocyanato, ureido, halo, epoxy, epichlorohydrin, sulfuryl halide, mercapto, ester, —NH$_2$, CONH$_2$, CH$_2$—X (where X is Cl, Br, or I), —CH=CH$_2$, —SH, S—M+, or O—M+ (where M+ is Na+, Li+, and K+) moieties, said platelet particles being present in an amount of from about 0.001% to about 60% by weight of the composite material; and (b) subjecting said mixture to a shear having a shear rate which is sufficient to dissociate all or a portion of said layers to form platelet particles having an average thickness of less than about 50 Å and to uniformly disperse said platelet particles in said polymer to form said polymer composite wherein said platelet particles are uniformly dispersed in said matrix.

24. A composite material of claim 1 having an ultimate elongation, tensile modulus, tensile yield strength and heat distortion under load which is greater than that of said polymer.

25. A composite material of claim 24 wherein said ultimate elongation is at least about two times the ultimate elongation of said polymer.

26. A composite material of claim 25 wherein said ultimate elongation is at least about three times the ultimate elongation of said polymer.

* * * * *